United States Patent
Waizenauer et al.

(10) Patent No.: US 11,084,197 B2
(45) Date of Patent: Aug. 10, 2021

(54) DEVICE FOR PRODUCING COMPONENTS USING AN INJECTION MOLDING METHOD, INCLUDING A REGULATING SYSTEM

(71) Applicant: NEXUS Elastomer Systems GmbH, Eberstalzell (AT)

(72) Inventors: Dietmar Waizenauer, Kematen an der Krems (AT); Bernhard Waizenauer, Wels (AT)

(73) Assignee: NEXUS ELASTOMER SYSTEMS GMBH, Eberstalzell (AT)

( * ) Notice: Subject to any disclaimer, the term of this patent is extended or adjusted under 35 U.S.C. 154(b) by 232 days.

(21) Appl. No.: 16/317,670

(22) PCT Filed: Jul. 11, 2017

(86) PCT No.: PCT/AT2017/060172
§ 371 (c)(1),
(2) Date: Jan. 14, 2019

(87) PCT Pub. No.: WO2018/009951
PCT Pub. Date: Jan. 18, 2018

(65) Prior Publication Data
US 2019/0217514 A1    Jul. 18, 2019

(30) Foreign Application Priority Data

Jul. 15, 2016 (AT) .................................. A 341/2016

(51) Int. Cl.
*B29C 45/28* (2006.01)
*B29C 45/76* (2006.01)
(Continued)

(52) U.S. Cl.
CPC ............ *B29C 45/281* (2013.01); *B29C 45/03* (2013.01); *B29C 45/231* (2013.01); *B29C 45/76* (2013.01);
(Continued)

(58) Field of Classification Search
CPC ....................................................... B29C 45/83
See application file for complete search history.

(56) References Cited

U.S. PATENT DOCUMENTS

| 4,380,426 A | 4/1983 | Wiles |
| 4,956,141 A * | 9/1990 | Allen ..................... B29C 33/68 |
| | | 264/297.2 |

(Continued)

FOREIGN PATENT DOCUMENTS

| EP | 1447200 A2 | 8/2004 |
| JP | H091600 A | 1/1997 |

(Continued)

OTHER PUBLICATIONS

Herbert Rees, Mold Engineering, 2002, Hanser, 2nd ed, pp. 189-198 (Year: 2002).*

(Continued)

*Primary Examiner* — Benjamin A Schiffman
(74) *Attorney, Agent, or Firm* — Panitch Schwarze Belisario & Nadel LLP

(57) ABSTRACT

A device for producing components using an injection molding method includes at least one cavity (1a) for forming a respective product, at least one injection nozzle (3a) through which material is injected into the cavity (1a), a mold release (4), a distribution channel (10), a media supply (11), an exhaust air channel or return channel (12), at least one shut-off needle (6a). The shut-off needle is connected to a piston in a force-fitting or form-fitting manner and is inserted into the injection nozzle (3a). At least one valve (7a) for opening the needle (6a) and at least one valve (8a) for closing the needle (6a) are provided, such that the valve (7a) and the valve (8a) are arranged directly adjacent to the shut-off needle (6a). A control unit for the valve (7a) and the valve (8a) is also provided.

16 Claims, 1 Drawing Sheet

(51) Int. Cl.
  *B29C 45/03* (2006.01)
  *B29C 45/23* (2006.01)
  *B29C 45/40* (2006.01)

(52) U.S. Cl.
  CPC ...... *B29C 45/40* (2013.01); *B29C 2945/7604* (2013.01); *B29C 2945/76006* (2013.01); *B29C 2945/7626* (2013.01); *B29C 2945/7628* (2013.01); *B29C 2945/76545* (2013.01); *B29C 2945/76752* (2013.01)

(56) References Cited

U.S. PATENT DOCUMENTS

| | | | | |
|---|---|---|---|---|
| 5,468,141 | A * | 11/1995 | Iwami | B29C 33/3828 |
| | | | | 249/114.1 |
| 6,305,923 | B1 * | 10/2001 | Godwin | B29C 45/1603 |
| | | | | 425/143 |
| 6,585,505 | B2 * | 7/2003 | Kazmer | B29C 45/27 |
| | | | | 264/40.3 |
| 9,682,507 | B2 * | 6/2017 | Schreyer | B29C 45/76 |
| 9,827,701 | B2 * | 11/2017 | Galati | F16K 31/061 |
| 2002/0164392 | A1 | 11/2002 | Kazmer et al. | |
| 2013/0334727 | A1 * | 12/2013 | Mine | B29C 45/14827 |
| | | | | 264/139 |
| 2014/0113115 | A1 * | 4/2014 | Ito | B32B 38/0036 |
| | | | | 428/201 |
| 2015/0028521 | A1 * | 1/2015 | Chen | B29C 45/27 |
| | | | | 264/266 |
| 2015/0158227 | A1 | 6/2015 | Schreyer et al. | |
| 2015/0290852 | A1 * | 10/2015 | Nakagawa | B29B 11/00 |
| | | | | 264/267 |
| 2016/0144543 | A1 | 5/2016 | Galati et al. | |

FOREIGN PATENT DOCUMENTS

| | | |
|---|---|---|
| WO | 0108462 A2 | 2/2001 |
| WO | 2016081713 A1 | 5/2016 |

OTHER PUBLICATIONS

Int'l Search Report dated Oct. 6, 2017 in Int'l Application No. PCT/AT2017/060172.
Int'l Written Opinion of the Int'l Searching Authority dated Oct. 24, 2017 in Int'l Application No. PCT/AT2017/060172.

* cited by examiner

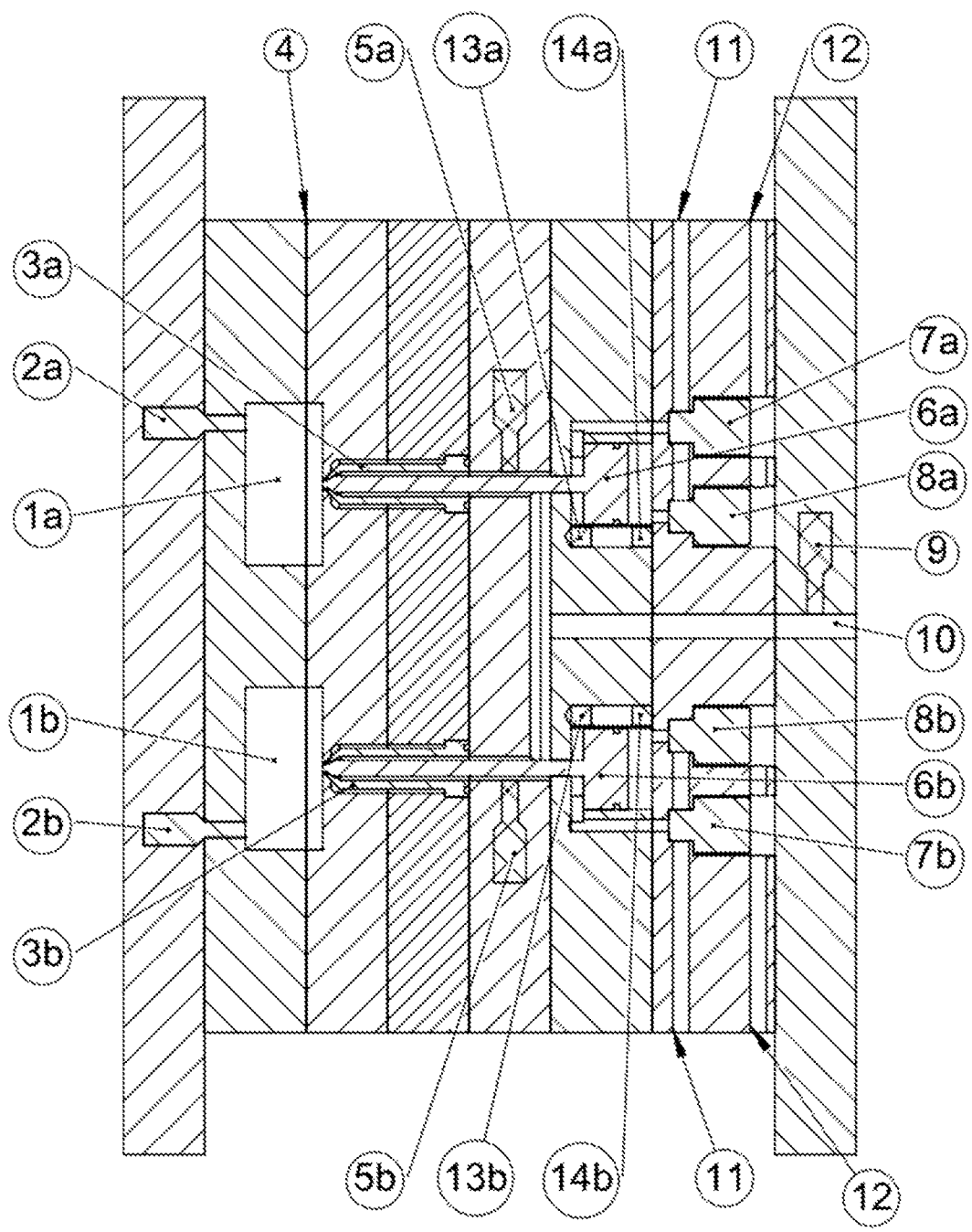

DEVICE FOR PRODUCING COMPONENTS USING AN INJECTION MOLDING METHOD, INCLUDING A REGULATING SYSTEM

CROSS-REFERENCE TO RELATED APPLICATION

This application is a Section 371 of International Application No. PCT/AT2017/060172, filed Jul. 11, 2017, which was published in the German language on Jan. 18, 2018, under International Publication No. WO 2018/009951 A1, which claims priority under 35 U.S.C. § 119(b) to Austrian Application No. A 341/2016, filed Jul. 15, 2016, the disclosures of which are incorporated herein by reference in their entireties.

The invention relates to a device for producing components using an injection molding method.

STATE OF THE ART

Injection nozzles of injection molding tools are sometimes provided with shut-off needles to shut off material flow. Such shut-off needle systems for injection molding tools are driven pneumatically, electrically or hydraulically.

During an injection process of multi-cavity tools, various filling levels in the individual cavities are achieved due to flow properties, different channel lengths and manufacturing variations or tolerances.

In order to achieve equal filling of the produced parts, regulating systems are used, which individually reduce the amount of material of each single injection nozzle. According to the current state of the art, the user of a machine assesses the filling levels of individual cavities based on the injection cycle by means of the produced parts and adjusts regulation at his own discretion in order to achieve uniform filling or a flawless product. Since the regulation of individual cavities mutually affect each other, the manual adjustment process is tedious and requires the user to have experience.

Basically, there are the following types of regulation:
regulation by means of throttling,
regulation by means of timing of needle movement.

Regulation by means of throttling may be easily achieved by introducing additional throttle distance into the material flow. Here, all needles may be opened and closed at the same time. Regulation occurs by means of the different drops in pressure at the throttle positions.

However, mechanically working throttle systems (throttle distances) cannot regulate small shot weights in reliable processes anymore when flow velocity is low.

Regulation by means of timing (cascading) of needle movement is more complex. In a cascading pneumatic or hydraulic control, every needle is controlled via a separate valve. It is thus possible to open and close needles in a staggered manner. Implementations require a significant number of channels for conducting media within the injection molding device. Regulation is achieved via different opening times of needles and corresponding filling times. Time-controlled systems work independently from flow rates and are usable even with smallest shot weights.

The object of the invention is a simple system that may vary the filling levels of individual cavities of needle shut-off systems. It is to be easily retrofittable to existing systems. The distance between individual cavities is to be reduced to a minimum and not to be increased by the adjustment system.

According to the invention, this is achieved by providing a device comprising
at least one cavity for forming a respective product,
at least one injection nozzle through which material is injected into the cavity,
a mold release,
a distribution channel,
a media supply,
an exhaust air channel or return channel,
at least one shut-off needle that is connected to a piston in a force-fitting or form-fitting manner and that is inserted into the injection nozzle,
at least one valve for opening the needle, and
at least one valve for closing the needle,
wherein
the valve for opening the needle and the valve for closing the needle are arranged directly adjacent to the shut-off needle, and
a control unit for the valve for opening the needle and the valve for closing the needle is provided.

The invention comprises actuating the needle shut-off system by means of miniature valves positioned directly at the shut-off needle (directly at the actuator). The short actuating paths reduce the response of the actuators to a minimum. In addition, the space required compared to existing mechanical throttle systems is smaller, and nozzle distances may be reduced to a minimum.

For example, the valve may be a 3/2 or 5/2 directional valve, wherein the numbers refer to "ports/positions" (for example, a "3/2 directional valve" refers to a valve with 3 ports and 2 positions; a port may, for example, be a supply channel, a working channel, and an exhaust air channel or return channel; a position may, for example, be "open" or "closed").

Cascading needle shut-off systems are available on the market. The valves, however, are positioned far from the actuator (outside the injection molding tools). Cross bores required for providing working ducts for the piston limit the number of individual needles. The bores are labor-intensive. In addition, a high number of media ducts is required outside the tool. Maintenance and fitting of such tools is complicated and error-prone.

Compared to cascaded needle shut-off systems with external valves, the following advantages are achieved:
  smallest cavity spacings are possible since no cross bores for control channels are required
  simple retrofitting to existing systems
  simplest maintenance because the valves are directly mounted in a plate.

Compared to systems with electrically driven needles or opening stroke limitations, the following advantages are achieved:
  fewer mechanical parts, less maintenance
  less space required/smallest spacing between cavities
  small shot weights are regulatable, where mechanical throttles are not able to work anymore without affecting the process
  existing tools may easily be retrofitted
  high power density of pneumatic or hydraulic systems may be taken advantage of
  overload-protected, in contrast to electrically driven needles
  high availability of valves, no maintenance required.

Control is based on a pneumatically or hydraulically driven needle closure. By means of an external trigger (open needle closure), a signal is sent to the control unit. The control unit comprises, depending on the number of needle closure valves, electronic outputs for actuating the coils of the individual miniature valves. An electrically driven coil moves an anchor, which mechanically opens the media supply channel. The miniature valves are arranged directly in the tool, mounted close to the pneumatic/hydraulic piston of the needle closure system. The media may either be pressurized air or a liquid.

If a cavity produces a poor molded part (broken-out mold insert, wrong measure, etc.) or if the needle closure of a cavity functions too sluggishly due to increased friction, it may be turned off via the regulator. In this case, the needle remains permanently closed, and no material is injected into the cavity.

The pneumatically or hydraulically driven needle closure piston opens within a system-dependent reaction time. This time is usually always the same. If friction in the mechanical system increases or decreases due to wear of the seal or leakage in the system (or due to a mechanical problem), the opening time may increase or sometimes also decrease (e.g. if air pressure or hydraulic pressure increases) during production.

Another embodiment provides a device comprising
- at least two cavities for respectively forming products,
- at least two injection nozzles through which material is injected into the respective cavities,
- a mold release,
- a distribution channel,
- a media supply,
- an exhaust air channel or return channel,
- at least two shut-off needles that are connected to a piston in a force-fitting or form-fitting manner and that are inserted into respective injection nozzles,
- at least two valves for opening respective needles, and
- at least two valves for closing respective needles,
- wherein
- the valves for opening respective needles and the valves for closing respective needles are arranged directly adjacent to respective shut-off needles, and
- a control unit for the valves for opening respective needles and the valves for closing respective needles is provided.

Such a device allows the production of several parts simultaneously.

In one embodiment, the device may comprise at least one sensor, which is arranged in the movement range of the piston or the shut-off needle. In another embodiment, the device may comprise at least two sensors that are arranged in the movement range of the piston or the shut-off needles.

These sensors detect the "open" position and the "closed" position of the needle. By measuring the opening times of each needle closure system, the respective opening time may be measured and different opening times may be compensated by actuators. This allows an evaluation for preventive maintenance. In case of an error, if an actuator does not open anymore, a warning may be issued. When monitoring the "closed" position, an error function may be detected. The same runtime monitoring as for "open" may be used for closing. The "open" position of a piston is determined by means of sensor technology. Possible sensor types are e.g. a mechanical switch contact, an inductive or capacitive sensor (depending on the material of the piston or the actuator) or a Hall effect sensor. Other sensor types are also possible, e.g. optical sensors. By calculating the time lag between the actuation time of the valve and the response of the sensor, an opening time constant may be calculated. This constant may be used for compensating different opening times. Even if an opening time becomes longer or shorter during production, this time is corrected by regulation and the needle closure remains in operation with an unchanged throttle. In addition, the maintenance state of the needle closure system may be determined based on this time constant. If there are sensors measuring the "open" position and sensors measuring the "closed" position, it may also be detected whether the needle is stuck in the middle between the "open" position and the "closed" position.

In one embodiment of the invention, the device may comprise at least one sensor connected to the cavity. In one embodiment of the invention, the device may comprise at least two sensors connected to respective cavities. These sensors allow determining the injection amounts in a cavity. If these do not correspond to calculated values, the injection amounts may be adjusted based on the sensor data.

In one embodiment of the invention, the device may comprise at least one sensor arranged in front of the injection nozzles in the distribution channel. In one embodiment of the invention, the device may comprise at least two sensors arranged in front of the respective injection nozzles in the distribution channel. These sensors allow measuring the injection amounts in the injection nozzles. If these do not correspond to the calculated values, the injection amounts may be adjusted based on the sensor data.

In one embodiment of the invention, the sensor, which is arranged in the movement range of the piston or the shut-off needle, is a capacitive sensor, an inductive sensor, a Hall effect sensor, a magnetic sensor, or a switching contact. Such sensors are perfectly suitable for determining the position of the shut-off needle.

In one embodiment of the invention, the sensor, which is connected to a respective cavity, may be a pressure transducer or a temperature sensor. This allows measuring the pressure in the cavity and controlling the injection amount correspondingly. However, the sensor may also be a temperature sensor, which detects the cold injected mass.

In one embodiment of the invention, the sensor, which is arranged in front of respective injection nozzles in the distribution channel, may be a pressure transducer. Measuring the pressure allows drawing conclusions regarding the injection amount and its regulation.

In one embodiment of the invention, the device may comprise a sensor, preferably a pressure transducer, at the entrance of the distribution channel. This allows measuring the inlet pressure into the device. The pressure in the distribution channel may be used for optimizing throttle settings.

In another aspect, the invention relates to the use of a device as defined above for producing injection-molded parts. Such a device allows producing uniform parts with smallest tolerances and variations because the manufacturing process may be controlled precisely.

SHORT DESCRIPTION OF THE DRAWINGS

The following reference numbers are used in the drawing and in the examples:
1a cavity 1a
1b cavity 1b
2a sensor cavity 1a
2b sensor cavity 1b
3a injection nozzle cavity 1a
3b injection nozzle cavity 1b
4 mold release
5a sensor distribution channel cavity 1a
5b sensor distribution channel cavity 1b
6a shut-off needle with piston cavity 1a 6b shut-off needle with piston cavity 1b
7a valve "open needle" cavity 1a
7b valve "open needle" cavity 1b
8a valve "close needle" cavity 1a
8b valve "close needle" cavity 1b
9 sensor distribution channel entrance
10 distribution channel entrance
11 media supply
12 exhaust air channel or return channel
13a sensor needle position cavity 1a closed
13b sensor needle position cavity 1b closed
14a sensor needle position cavity 1a open
14b sensor needle position cavity 1b open FIG. 1 shows an embodiment of the invention with two cavities.

EXAMPLE

Example 1: Device with at Least One Cavity 1a

The device for producing components using an injection molding method is structured as follows and comprises
  at least one cavity 1a for forming a respective product,
  at least one injection nozzle 3a through which material is injected into the cavity 1a,
  a mold release 4,
  a distribution channel 10,
  a media supply 11,
  an exhaust air channel or return channel 12,
  at least one shut-off needle 6a that is connected to a piston in a force-fitting or form-fitting manner and that is inserted into the injection nozzle 3a,
  at least one valve 7a for opening the needle 6a, and
  at least one valve 8a for closing the needle 6a,
  wherein
  the valve 7a and the valve 8a are arranged directly adjacent to the shut-off needle 6a, and
  a control unit for the valve 7a and the valve 8a is provided.

Actuation of the needle shut-off system occurs by means of miniature valves 7a, 8a arranged directly at the shut-off needle 6a (directly at the actuator). The short actuating paths reduce the response of the actuators to a minimum. In addition, the space required compared to existing mechanical throttle systems is smaller, and nozzle distances may be reduced to a minimum.

Compared to cascaded needle shut-off systems with external valves, the following advantages are achieved:
  smallest cavity spacings are possible since no cross bores for control channels are required
  simple retrofitting to existing systems
  simplest maintenance because the valves are directly mounted in a plate.

Compared to systems with electrically driven needles or opening stroke limitations, the following advantages are achieved:
  fewer mechanical parts, less maintenance
  less space required/lowest distances from cavity to cavity
  small shot weights are regulatable, where mechanical throttles are not able to work anymore without affecting the process
  existing tools may easily be retrofitted
  high power density of pneumatic or hydraulic systems may be taken advantage of
  overload-protected, in contrast to electrically driven needles
  high availability of the valves, not maintenance required.

The needles 6a may be opened and closed pneumatically or hydraulically. By means of an external trigger (open needle closure), a signal is sent to the control unit. The control unit comprises, depending on the number of needle closure valves, electronic outputs for actuating the coils of the individual miniature valves 7a, 8a. An electrically driven coil moves an anchor, which mechanically opens the media supply channel 11. The miniature valves 7a, 8a are arranged directly in the tool, mounted close to the pneumatic/hydraulic piston of the needle closure system. The media may either be pressurized air or a liquid.

The force-fitting or form-fitting connection between the shut-off needle 6a and the piston allows an exchange of the needle if it stops working.

If a cavity 1a produces a poor molded part (broken-out mold insert, wrong measure, etc.) or if the needle closure of a cavity 1a functions too sluggishly due to increased friction, it may be turned off via the regulator. In this case, the needle 6a remains permanently closed, and no material is injected into the cavity.

The pneumatically or hydraulically driven needle closure piston opens within a system-dependent reaction time. This time is usually always the same. If friction in the mechanical system increases due to wear of the seal or leakage in the system (or due to a mechanical problem), the opening time may increase or sometimes also decrease (e.g. if air pressure or hydraulic pressure increases) during production.

For example, the valve 7a, 8a may be a 3/2 or 5/2 directional valve, wherein the numbers refer to "ports/positions" (for example, a "3/2 directional valve" refers to a valve with 3 ports and 2 positions; a port may, for example, be a supply channel, a working channel, and an exhaust air channel or return channel; a position may, for example, be "open" or "closed"). Via the supply channel, a media, e.g. pressurized air or a liquid, is supplied for closing the piston. Via the exhaust air or return channel, the media, e.g. pressurized air or a liquid, is drawn off again during opening.

Example 2: Device with at Least One Cavity 1a, Comprising at Least One Sensor 13a, 14a, which is Arranged in the Movement Range of the Piston or the Shut-Off Needle 6a Based on the device described in Example 1, the device may comprise at least one sensor 13a, 14a, which is arranged in the movement range of the piston or shut-off needle 6a.

These sensors 13a, 14a detect the "open" and "closed" position of the needle 6a. By measuring the opening times of each needle closure system, the respective opening time may be measured and different opening times may be compensated by actuators. This allows an evaluation for preventive maintenance. In case of an error, if an actuator does not open anymore, a warning may be issued. When monitoring the "closed" position, an error function may be detected. The same runtime monitoring as for "open" may be used for closing. The "open" position of a piston is determined by means of sensor technology. Possible sensor types are e.g. a mechanical switch contact, an inductive or capacitive sensor (depending on the material of the piston or the actuator), a magnetic sensor or a Hall effect sensor. Other sensor types are also possible, e.g. optical sensors. By calculating the time lag between the actuation time of the valve 7a, 8a and the response of the sensor 13a, 14a, an opening time constant may be calculated. This constant may be used for compensating the different opening times. Even if an opening time becomes longer or shorter during production, this time is corrected by regulation and the needle closure remains in operation with an unchanged throttle. In addition, the maintenance state of the needle closure system may be determined due to this time constant. If there are sensors 13*a* measuring the "open" position and sensors 14*a* measuring the "closed" position, it may also be detected whether the needle is stuck in the middle between the "open" position and the "closed" position. The device may be provided with only one sensor 13*a* or with only one sensor 14*a* or with both sensors 13*a*, 14*a*.

Example 3: Device with at Least One Cavity 1*a*, Comprising at Least One Sensor 2*a*, which is Connected to the Cavity 1*a*

Based on the device described in Example 1 or Example 2, this device may comprise at least one sensor 2*a*, which is connected to cavity 1*a*.

This sensor 2*a* may determine the injection amount in the cavity 1*a*. If they do not correspond to the calculated values, the injection amounts may be adjusted based on the sensor data. Sensor 2*a* may be a pressure transducer or a temperature sensor. This allows measuring the pressure in the cavity 1*a* and controlling the injection amount correspondingly. However, the sensor 2*a* may also be a temperature sensor, which detects the cold injected mass.

Example 4: Device with at Least One Cavity 1*a*, Comprising at Least One Sensor 5*a*, which is Arranged in Front of the Injection Nozzle 3*a* in the Distribution Channel 10

Based on the device described in Example 1 or Example 2 or Example 3, the device may comprise at least one sensor 5*a*, which is arranged in front of the injection nozzle 3*a* in the distribution channel 10. This sensor 5*a* allows measuring the pressure on front of the injection nozzle 3*a*. If it does not correspond to the calculated values, the injection amounts may be adapted based on the sensor data. Sensor 5*a* may be a pressure transducer. The pressure in front of the injection nozzles may be used for optimizing throttle settlings.

Example 5: Device with at Least One Cavity 1*a*, Comprising a Sensor 9 at the Entrance of the Distribution Channel 10

Based on the device described in Example 1 or Example 2 or Example 3 or Example 4, the device may comprise a sensor 9 at the entrance of the distribution channel 10. This allows measuring the inlet pressure into the device. Sensor 9 may be a pressure transducer. This allows measuring the pressure in the distribution channel 10. The pressure in the distribution channel 10 may be used for optimizing the throttle settings.

Example 6: Device with at Least One Cavity 1*a* Having an External Balance

Based on a device described in one of the preceding examples, an external balance may be present. Ejected parts are weighted and compared to a reference value. A control unit issues commands to the valves 7*a*, 8*a* to adjust the opening times in order to achieve the reference value.

Example 7: Device with at Least Two Cavities La, Lb

Based on a device described in one of the preceding examples, there may also be at least two cavities 1*a*, 1*b*, with all other elements, i.e. shut-off needles 6*a*, 6*b*, injection nozzles 3*a*, 3*b*, valves 7*a*, 7*b*, valves 8*a*, 8*b*, sensors 13*a*, 13*b*, sensors 14*a*, 14*b*, sensors 2*a*, 2*b*, sensors 5*a*, 5*b* being present at least in duplicate. The respective elements may also be present three times, four times, five times or more. The more repetitions, the more parts may be produced simultaneously. The characteristics and advantages presented in the above Examples 1 to 6 also apply to a device with at least two cavities 1*a*, 1*b*.

Example 8: Use of a Device as Described According to One of the Examples 1 to 7 for Producing Injection-Molded Parts One of the devices described in Example 1 to 7 is used in this example.

Raw material is introduced via the distribution channel 10 into the injection nozzle 3*a*. By opening valve 7*a*, shut-off needle 6*a* is opened and the raw material is introduced into cavity 1*a*. After curing, the part is ejected. Then the process starts from the beginning. Depending on how many cavities 1*a* are present, one or more parts may thus be produced. Optional sensors 13*a*, 14*a*, 2*a*, 5*a*, and 9 may measure the amount of the injected raw material as described above. If a deviation from the reference value is detected, this may be counteracted by adjusting the opening times of shut-off needle 6*a*.

Evaluation criteria for injection-molded parts
Underfilling
lower part weight
smaller dimension, e.g. length
flowing point
notch
no pronounced surface
unfilled transition, if present
Overinjection
rib on parts
increased part weight
larger dimension of parts, e.g. length
Options for Measuring Evaluation Criteria
optically via a camera system
determining part weight by means of a measuring device, e.g. balance
optically by machine user
tactually
Connection of the Evaluation Methods with the Regulating Means
fully automatic via interfaces
semi-automatic via the entrance of values through a HMI by the user (parts are weighted or evaluated manually and entered directly into the user interface, the optimal throttle setting is calculated and set automatically)
manually
Interfaces
serial
parallel
BUS systems (e.g. ASI, Ethernet, Profibus, etc.)
HMI
Control Circuit
Closed control circuit via feedback of output variables (filling level of parts) (see following examples)

Example 9: Use of a Device as Described in One of the Examples 1 to 7 for Producing Injection-Molded Parts According to the "Control Circuit Functional Principle"

Based on one of the devices from Examples 1 to 7 and based on the use of Example 8, production follows the "control circuit functional principle". A closed control circuit allows fast adjustment of needle closure throttle systems. The produced parts are automatically or manually evaluated based on optical or physical criteria and used for subsequent injection processes in order to adjust nozzle regulation. An integrated regulator, e.g. state or PID regulator, optimizes nozzle settings within a few cycles. Starting times are shortened, fully automatic evaluation of produced parts guarantees constant part quality during production.

Example 10: Use of a Device as Described in One of the Examples 1 to 7 for Producing Injection-Molded Parts According to the "Closed Control Circuit" Functional Principle Based on a device from Examples 1 to 7 and on the use of Example 8 or 9, production follows the "closed control circuit" functional principle. The molded parts are injected, and subjected to evaluation after the injection process, e.g. weight, size, and an indicator are optically identified. This information goes back to the control unit and extends or shortens the "open" position of the needle closure of this cavity.

A further option consists in measuring pressure or temperature within the cavity, as is typical for thermoplastic tools. By means of this information, the balance between individual cavities may be adjusted when a part fills up.

Another possibility consists in optically checking components and changing the opening times of the actuators.

Example 11: Use of a Device as Described in One of the Examples 1 to 7 for Producing Injection-Molded Parts According to the "Balance" Functional Principle Based on one of the devices from Examples 1 to 7 and on a use from Example 8, 9 or 10, production follows the "balance" functional principle Due to manufacturing variations in the distribution system of injection molding tools it may happen that individual cavities in multi-cavity tools are filled faster than others. The result of this is that the individual parts do not have the same filling level, which results in dimensions too small or too big, or in defects.

By means of the adjustment system (cascading of needle closure system), the filling level of each individual cavity may be adjusted.

Solution: Every single molded part is weighted by means of a balance. The weight information thus obtained of each individual injection-molded part is transmitted to the control unit (manually or automatically). The control unit calculates the mean weight and the correspondingly required lag time of each cavity. By repeating this adjustment cycle several times, an optimal setting is achieved. The balance may be internal or external.

Example 12: Use of a Device as Described in One of the Examples 1 to 7 for Producing Injection-Molded Parts According to the "Total Shot Weight" Functional Principle Based on one of the devices from Examples 1 to 7 and on a use from Example 8, 9, 10 or 11, production follows the "total shot weight" functional principle.

By means of the adjustment system, the filling level of each individual cavity may be adjusted. However, the total amount of injected material is determined by the injection molding machine. By simultaneously reducing or increasing the "throttle position" or the opening time, the total shot weight may be changed only slightly.

Solution: The control unit transmits the total shot weight obtained to the injection molding machine or the total shot weight it stored at the control unit, and the required value is transmitted to the injection molding machine.

The invention claimed is:

1. A device for producing components using an injection molding method, the device comprising
 at least one cavity (1a) for forming a component,
 at least one injection nozzle (3a) through which material is injected into the at least one cavity (1a),
 a mold release (4),
 a distribution channel (10),
 a media supply (11),
 an exhaust air channel or return channel (12),
 at least one shut-off needle (6a) connected to a piston in a force-fitting or form-fitting manner and inserted into the at least one injection nozzle (3a),
 at least one first valve (7a) for opening the at least one shut-off needle (6a),
 at least one second valve (8a) for closing the at least one shut-off needle (6a), and
 a control unit for the at least one first valve (7a) and the at least one second valve (8a),
 wherein the at least one first valve (7a) and the at least one second valve (8a) are arranged directly adjacent to the at least one shut-off needle (6a).

2. The device according to claim 1, further comprising at least one first sensor (14a) arranged in a movement range of the piston or the shut-off needle (6a).

3. The device according to claim 2, wherein the at least one first sensor (14a, 14b) is selected from a capacitive sensor, an inductive sensor, a Hall effect sensor, a magnetic sensor, and a switching contact.

4. The device according to claim 1, further comprising at least one second sensor (13a) arranged in a movement range of the piston or the shut-off needle (6a).

5. The device according to claim 4, wherein the at least one second sensor (13a, 13b) is selected from a capacitive sensor, an inductive sensor, a Hall effect sensor, a magnetic sensor, and a switching contact.

6. The device according to claim 1, further comprising at least one third sensor (2a) connected to the cavity (1a).

7. The device according to claim 6, wherein the at least one third sensor (2a, 2b) is selected from a pressure transducer and a temperature sensor.

8. The device according to claim 1, further comprising at least one fourth sensor (5a) arranged in front of the at least one injection nozzle (3a) in the distribution channel (10).

9. The device according to claim 8, wherein the at least one fourth sensor (5a, 5b) is a pressure transducer.

10. The device according to claim 1, further comprising a fifth sensor (9) located at an entrance of the distribution channel (10).

11. The device according to claim 10, wherein the fifth sensor (9) is a pressure transducer.

12. A device for producing components using an injection molding method, the device comprising
 at least two cavities (1a, 1b) for forming respective components,
 at least two injection nozzles (3a, 3b) through which material is respectively injected into the at least two cavities (1a, 1b),
 a mold release (4),
 a distribution channel (10), a media supply (11), an exhaust air channel or return channel (12), at least two shut-off needles (6*a*, 6*b*) connected to a piston in a force-fitting or form-fitting manner and respectively inserted into the at least two injection nozzles (3*a*, 3*b*), at least two first valves (7*a*, 7*b*) for respectively opening the at least two shut-off needles (6*a*, 6*b*), at least two second valves (8*a*, 8*b*) for respectively closing the at least two shut-off needles (6*a*, 6*b*), and a control unit for the at least two first valves (7*a*, 7*b*) and the at least two second valves (8*a*, 8*b*), wherein the at least two first valves (7*a*, 7*b*) and the at least two second valves (8*a*, 8*b*) are respectively arranged directly adjacent to the at least two shut-off needles (6*a*, 6*b*).

13. The device according to claim 12, further comprising at least two first sensors (14*a*, 14*b*) arranged in a movement range of the piston or the shut-off needles (6*a*, 6*b*).

14. The device according to claim 12, further comprising at least two second sensors (13*a*, 13*b*) arranged in a movement range of the piston or the shut-off needles (6*a*, 6*b*).

15. The device according to claim 12, further comprising at least two third sensors (2*a*, 2*b*) connected to the respective cavities (1*a*, 1*b*).

16. The device according to claim 12, further comprising at least two fourth sensors (5*a*, 5*b*) respectively arranged in front of the at least two injection nozzles (3*a*, 3*b*) in the distribution channel (10).

\* \* \* \* \*